United States Patent [19]

Atherton et al.

[11] Patent Number: 4,656,378
[45] Date of Patent: Apr. 7, 1987

[54] MOTOR STATOR AND CONNECTOR FOR MAKING CONNECTIONS TO STATOR WINDINGS

[75] Inventors: Charles G. Atherton, Mechanicsburg; John C. Swartz, Harrisburg, both of Pa.

[73] Assignee: AMP Incorporated, Harrisburg, Pa.

[21] Appl. No.: 796,677

[22] Filed: Nov. 12, 1985

[51] Int. Cl.⁴ .............................................. H02K 11/00
[52] U.S. Cl. ........................................ 310/71; 310/42; 310/68 C
[58] Field of Search ................... 310/71, 68 R, 68 C, 310/68 B, 254, 216, 42; 336/107, 192; 361/23, 24, 25; 339/95 D, 97 R, 98, 99 R; 147/138 F

[56] References Cited

U.S. PATENT DOCUMENTS

| | | | |
|---|---|---|---|
| 3,350,586 | 10/1967 | Otto | 310/71 |
| 4,038,573 | 7/1977 | Hillyer | 310/71 |
| 4,177,397 | 12/1979 | Lill | 310/71 |
| 4,181,393 | 1/1980 | Lill | 310/71 |
| 4,186,318 | 1/1980 | Anderson | 310/68 C |
| 4,236,092 | 11/1980 | Di Flora | 310/68 C |
| 4,476,407 | 10/1984 | Hildebrandt | 310/71 |

FOREIGN PATENT DOCUMENTS 0148203  11/1979  Japan ....................................... 310/71

Primary Examiner—R. Skudy
Attorney, Agent, or Firm—F. W. Raring

[57] ABSTRACT

Motor stator comprises a stator core having coil windings thereon which are connected to lead wires. A motor protector is connected to at least one of the windings and to one lead wire. The electrical connections between the lead wires, the windings and the protector are made by means of a stator connector mounted on the stator core and which has a pocket which receives the protector. Adjacent to the pocket, a cavity is provided which receives a terminal which connects one of the windings to a first terminal extending from the protector. The windings extend to terminals in the connector which have terminal tabs. The tabs are matable with receptacles in a complementary connector which can be coupled to the stator connector. The second protector terminal extends into the connector housing and is received in a terminal therein which also has a tab for mating with a receptacle in the complementary connector.

7 Claims, 8 Drawing Figures

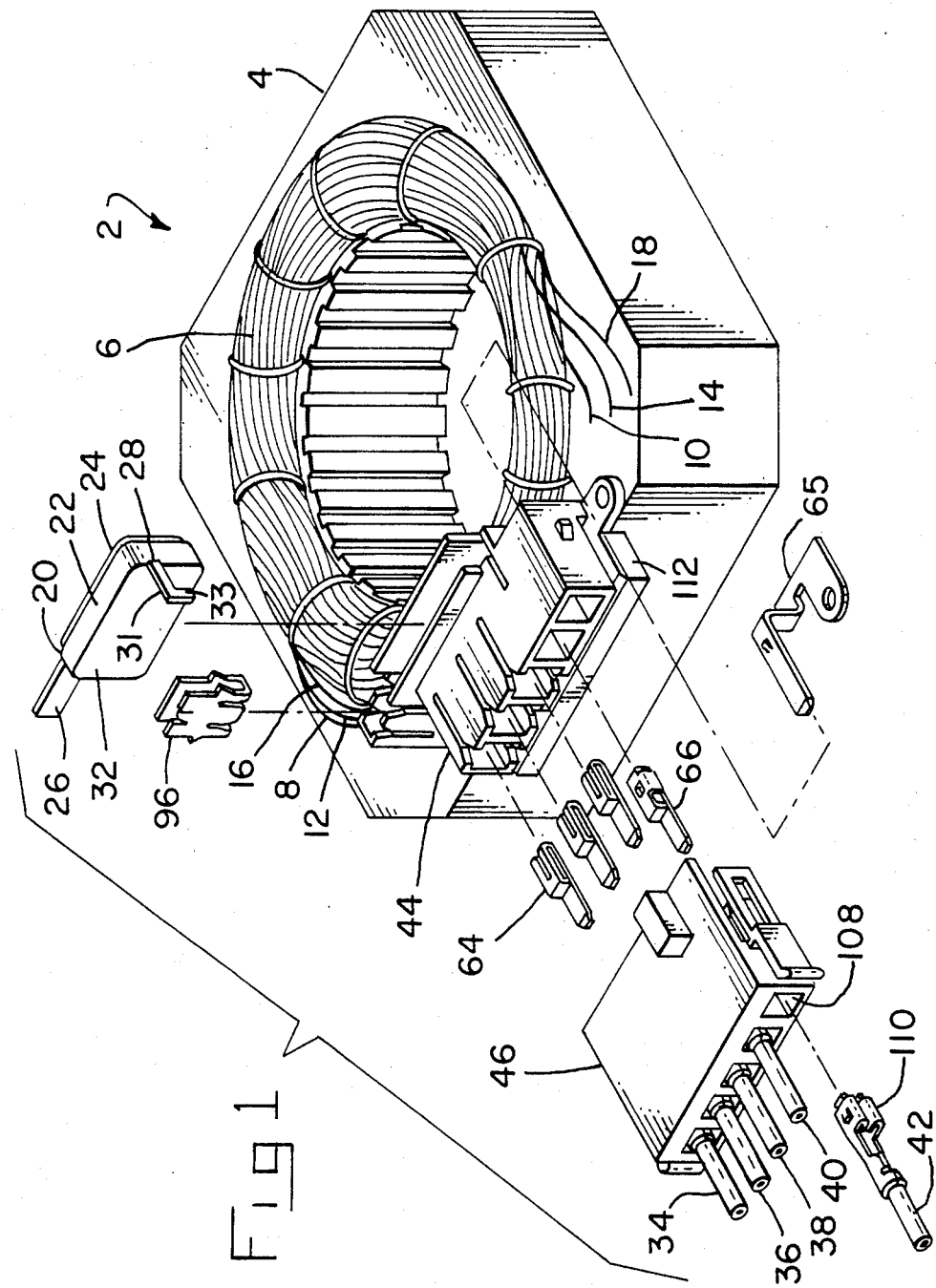

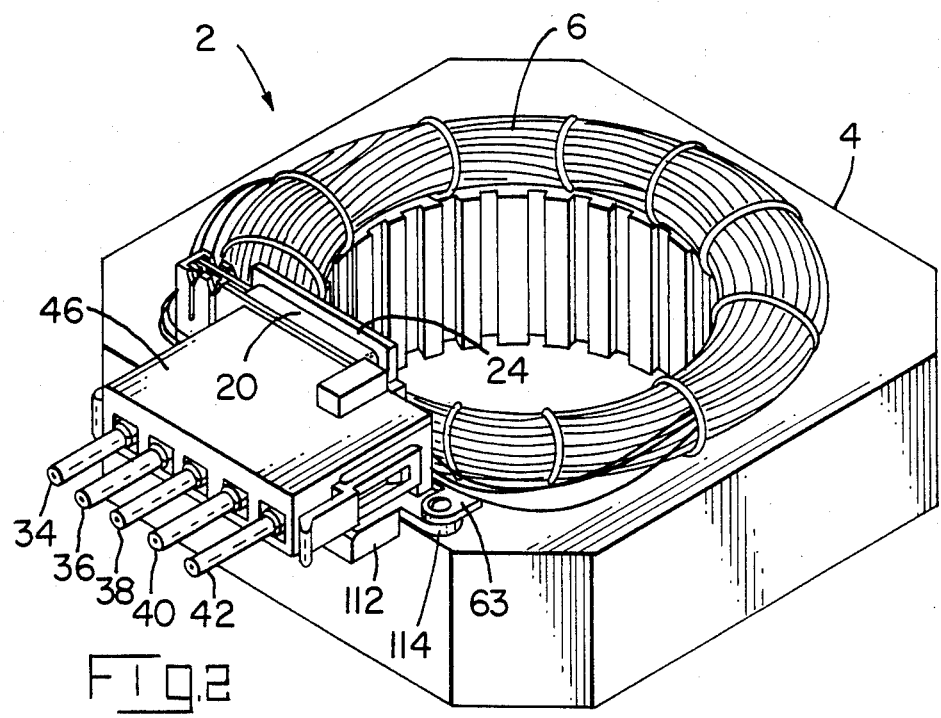
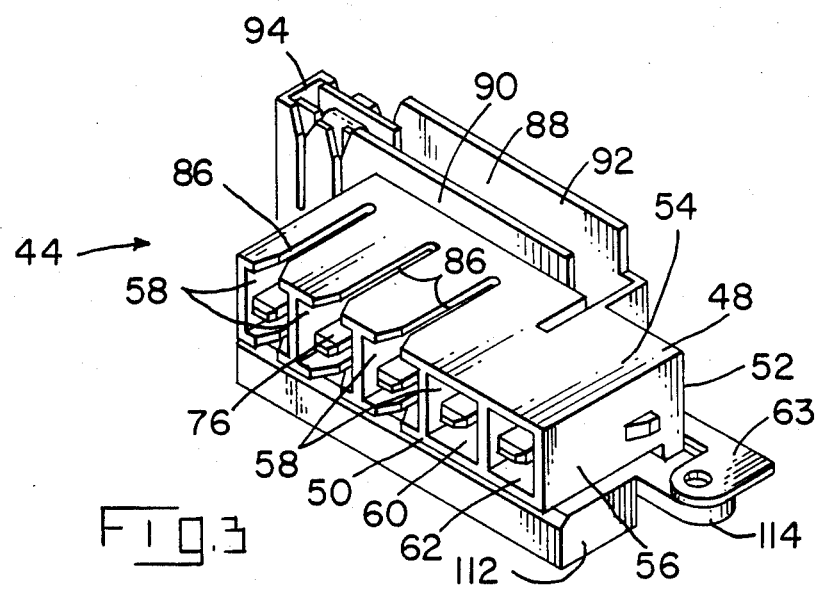

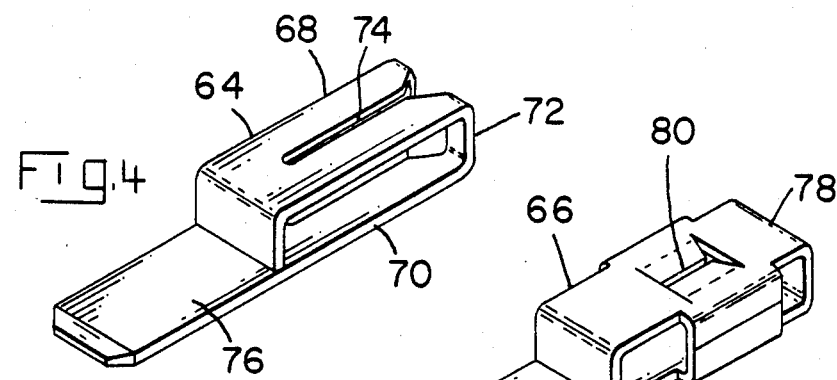
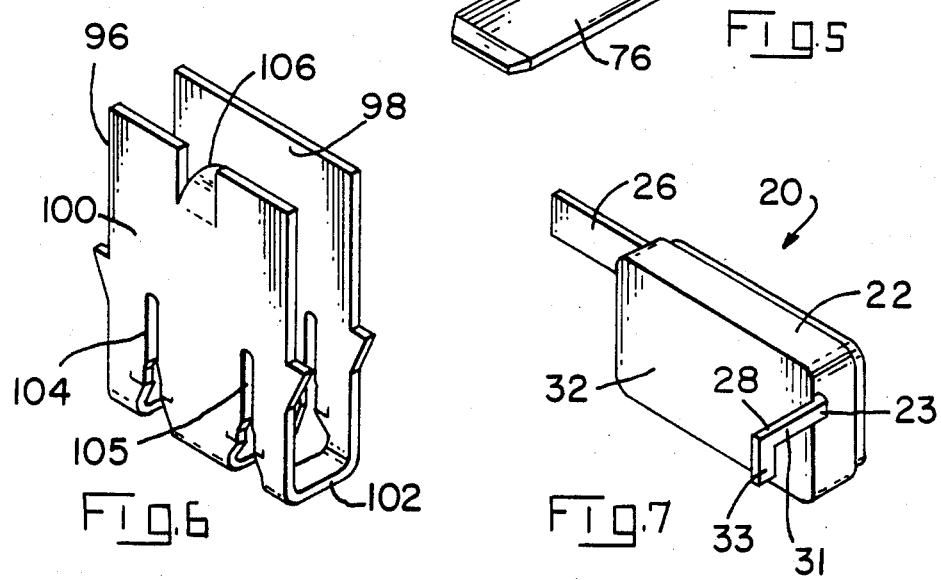
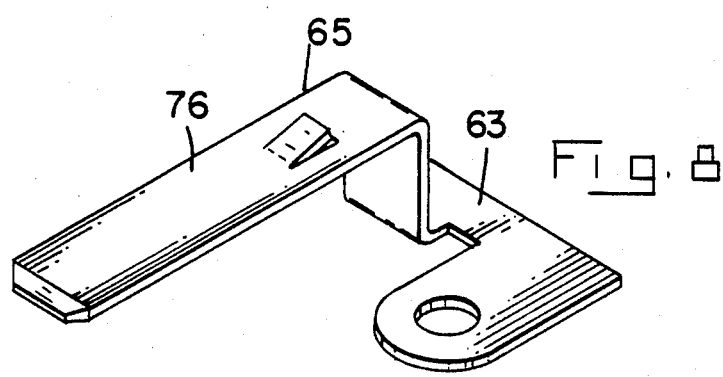

MOTOR STATOR AND CONNECTOR FOR MAKING CONNECTIONS TO STATOR WINDINGS

FIELD OF THE INVENTION

This invention relates to stator assemblies for electric motors and particularly to a stator having a connector thereon for connecting the winding ends on the stator and the protector for the motor to lead wires extending from the stator.

BACKGROUND OF THE INVENTION

The stator of an electric motor comprises a stator core, consisting of a stack of laminae, having at least two and sometimes more coil windings thereon. The ends of the windings must be connected to insulated lead wires which extend from the stator to the switch or other control circuit for the motor. In addition, it is common practice to provide a motor protector having two terminals, one of which is connected to one of the winding ends and the other of which is connected to a lead wire. The motor protector serves to shut down the motor in the event of an overload or other undesirable operating conditions.

The connections between the insulated lead wires and the ends of the windings are customarily made by crimping connecting devices on the ends of the leads and the winding ends. The terminals of the protector are similarly connected by crimped connectors to the end of one or more windings and a lead wire. It is often necessary to use color-coded lead wires and connect each wire to a specifically predetermined winding end since the lead wires in turn must be connected to predetermined terminals in a switch for controlling the motor.

The manufacturing and assembly procedure described above is relatively costly and time consuming and presents many opportunities for errors or mistakes in wiring the stator. For example, the operations of connecting the lead wires to the winding ends by means of crimped connections is usually carried out by hand with a crimping press and the operator must therefore handle the entire stator each time a crimped connection is made. These crimped connections between the lead wires and the winding ends must, moreover, be insulated since they are adjacent to the stator and the coil windings and the provision of insulation on these connections adds additional labor to the process. Mistakes can arise in wiring the stator since predetermined color-coded wires must be connected to the winding ends and if a mistake is made at this stage, the motor will not be properly connected to the switch for controlling the motor. When a protector is provided, it is customary to connect one or more of the winding ends to the protector and also to connect the protector to a lead wire and these operations add more labor to the process.

The present invention is directed to a combination of a motor stator and a stator connector which greatly facilitates the wiring of the stator and which eliminates many of the manual operations discussed above. The provision of a connector on the stator which can be mated with a complementary connector is also advantageous in that the lead wires can then be produced with a connector on their ends, the complementary connector, as a harness subassembly which can be produced with automatic or semiautomatic machines. Making the connections to the stator would then only require that two connectors be mated with each other.

THE INVENTION

A motor assembly in accordance with the invention comprises a stator, at least two coil windings on the stator, and a motor protector. The protector comprises a prismatic body having first and second protector terminal tabs extending therefrom. The windings have at least four winding ends, one of the winding ends being connected to the first protector terminal and at least three of the windings ends and the second protector terminal being connected to individual lead wires. The motor assembly is characterized in that a stator connector is provided which is matable with a complementary connector. The stator connector comprises an insulating housing having a mating face, a rear face, oppositely-facing first and second sidewalls, and oppositely-facing endwalls. The housing is mounted on one surface of the stator with the first sidewall against the one surface and with the rear face adjacent to a portion of the windings so that the mating face is directed outwardly and away from the stator. At least four cavities extend into the mating face of the connector housing, each of the cavities having a connector terminal therein. The connector terminals each have a matable contact portion which is adjacent to the mating face and which is matable with a complementary matable contact portion. At least three of the connector terminals have a winding and connecting portion and the fourth connector terminal has a tab receptacle. The three winding ends extend to the three connector terminals having winding end connecting portions and are connected to the winding ends and connecting portion of those terminals. A protector pocket is provided which is integral with the rear face of the housing proximate to one of the endwalls. An additional terminal-receiving cavity is provided which is integral with the housing adjacent to the one endwall and beside the protector pocket. The additional cavity has an additional terminal therein which has a tab receptacle portion and a winding end connecting portion. The protector is in the protector pocket with the first protector tab extending into the additional cavity and into the tab receptacle portion of the additional terminal. The one winding end which is connected to the first protector terminal extends into the additional cavity and is connected to the winding end portion of the additional terminal. The second protector tab extends away from the protector body, pass the rear face of the housing, and into the cavity which contains the fourth connector terminal having a tab receptacle portion. The tab portion of the second protector terminal extends into this tab receptacle.

THE DRAWING FIGURES

FIG. 1 is a perspective view showing a motor stator having a stator connector mounted thereon with the terminals exploded from the cavities in the connector.

FIG. 2 is a view similar to FIG. 1 but showing the positions of the parts assembled to each other.

FIG. 3 is an enlarged view of the stator connector.

FIGS. 4, 5 and 6 are views showing the different types of terminals used in the connector.

FIG. 7 is a perspective view of the motor protector.

FIG. 8 is a perspective view of a grounding terminal.

THE DISCLOSED EMBODIMENT

A stator assembly 2 in accordance with the invention, FIGS. 1 and 2, comprises a stator core having a plurality of windings 6 thereon. In the disclosed embodiment, three windings are provided, one main winding and two auxiliary windings which are of a smaller gauge wire then the main winding. The windings have winding ends 8, 10, 12, 14, 16, and 18 which extend towards the connector described below.

The stator assembly shown has a motor protector 20 (FIG. 7) comprising a prismatic body 22 having a metallic temperature sensing surface 24 on one of the major surfaces thereof. First and second protector terminal tabs 26, 28, extend from the protector, the first terminal tab 26 extending leftwardly as viewed in FIG. 7 from the metallic portion 24. The second protector terminal tab 28 extends laterally, as viewed in FIG. 7, past the leftwardly-facing major surface 32 as shown at 31. At its end, this terminal tab has a depending portion 33 which is mated with a terminal in the connector as will be described below.

Insulated lead wires 34, 36, 38, 40 and 42 are connected to various parts of the stator assembly. The lead wires 34, 36, and 38 are connected to the winding ends 10, 14, 18. The lead wire 40 is connected to the second protector terminal tab 28 and the lead wire 42 is connected to the stator core for grounding purposes. The lead wires have terminals 110 on their ends and are contained in cavities 108 in a complementary connector 46 which is mated with the stator connector 44.

The stator connector comprises a housing 48 having a mating face 50, a rear face 52, upper and lower sidewalls 54, and oppositely-facing endwalls 56. The housing is integral with and spaced above a base portion 112 which is mounted on the upper surface of the stator core and which has mounting ears 114 for fasteners by means of which it is secured to the core.

A plurality of terminal-receiving cavities extend into the mating face 50 of the housing 48 as shown at 58, 60 and 62. Three cavities 58 are provided which receive the winding ends 10, 14 and 18 and which also receive terminals of the type shown at 64, FIG. 4. The cavity 60 receives a terminal of the type shown at 66, FIG. 5 for connecting the depending tab portion 33 of the protector terminal tab 28 to lead wire 40 while the cavity 62 receives a terminal by means of which the ground wire 42 is connected to the stator core.

Each of the terminals 64 comprises a pair of parallel plate-like members 68, 70 which are connected to each other at corresponding ends by a bend or bight portion 72. A wire-receiving slot extends into the bight 74 and into the plate-like sections 68, 70 so a connection can be made to one of the winding ends by simply moving the winding end relatively into the slot 74. The upper housing sidewall 54 is provided with wire-admitting slots 86 which communicate with the cavities 58 so that the winding ends can be placed in these wire-admitting slots and upon movement of a terminal 64 into each of the cavities, the terminals will be connected to the winding ends.

The tab receptacle terminal 66 which is inserted into the cavity 60 has a tab portion 76 at one end and has a box-like tab receptacle portion 78 having integral spring members 80 which receive therebetween the depending portion 33 of the second protector terminal tab 28. This terminal 66 is not connected to a winding end.

The grounding terminal 65 has a tab portion 76 as do the terminals 66 and 64 and has an extension 63 which projects laterally of the rear face 52 of the housing and is connected to the surface of the core by a fastener as shown in FIG. 2.

The protector 20 is contained a pocket 88 on the rear face of the housing which is formed by a wall 90 that is integral with the rear face and a second wall 92 which is spaced from the wall 90 so that the protector can be moved downwardly from the position of FIG. 1 and into the pocket. When the protector is moved downwardly, the second terminal tab 28 will extend laterally past the rear face 52 and into an opening in the upper sidewall 54 and into the tab receptacle terminal 66.

An additional terminal cavity 94 is provided which extends from, and is an extension of, the pocket 88. This additional cavity is dimensioned to receive an additional terminal which serves as a commoning terminal and is shown at 96, FIG. 6. This terminal also comprises parallel plate sections 98, 100 connected by a bight 102. In this terminal, two wire-receiving slots 104, 105 are provided. The two smaller gauge auxiliary winding wire ends are received in one of the slots while the heavier gauge main winding end is received in the other slot 105. A tongue 106 extends from one of the plate sections and is reversely bent so that its end is between the plate-like members 98, 100. This spring-like tongue serves as a spring for the first protector terminal tab 26 when the protector is moved downwardly and into the cavity. It will be apparent then from FIG. 2 that the three winding ends 8, 12, 16 are commonly connected by the commoning terminal 96 and are also connected to the first protector terminal tab 26.

The stator connector 44 is assembled to the stator core after all of the coil windings have been wound on the core as shown in FIG. 1. Following assembly of the connector to the stator core, the winding ends 10, 14, 18 are dressed around the housing and placed in the wire-admitting slots 86 associated with the cavities 58. Thereafter, a terminal 64 is moved into each of these cavities to connect each of these winding ends, 10, 14, 18 to one of the terminals 64. The winding ends 8, 12, 16 are placed in the wire-admitting slots of the additional cavity 94 and the additional terminal 96 is then moved into this additional cavity commonly to connect the winding ends 8, 12, 16. Thereafter, it only remains to move the protector 20 into the pocket on the rear face of the housing and the first terminal tab 26 will be connected to the winding ends 8, 12, 16 and the second terminal tab 28 will be connected to the terminal 66. When the stator is assembled to a suitable frame and a rotor and placed in the equipment or appliance in which it is to be used, the necessary connections can then be made by merely mating the complementary connector 46 with the stator connector 44. The complementary connector 46 may be part of an electrical harness which would ordinarily be made by semiautomatic or automatic harness-making machinery.

It will be apparent from the foregoing that in the practice of the invention, all of the required connections for a motor stator can be made by few relatively simple operations which are carried out after winding of the coils on the stator core and that the final connections can then be made by means of a complementary connector.

We claim:

1. An electric motor assembly comprising a stator, at least two coil windings on the stator and a motor protector, the protector comprising a prismatic body having first and second protector terminal tabs extending therefrom, the windings having at least four winding ends, one of the winding ends being connected to the first protector tab, at least three of the winding ends and the second protector tab being connected to individual lead wires, the assembly being characterized in that:

a stator connector is provided which is matable with a complementary connector, the stator connector comprising an insulating housing having a mating face, a rear face, oppositely facing first and second sidewalls, and oppositely facing endwalls, the housing being mounted on one surface of the stator with the first sidewall against the one surface of the stator, with the rear face adjacent to a portion of the windings, and with the mating face directed outwardly and away from the stator, at least four cavities extend into the mating face, each of the cavities having a connector terminal therein, the connector terminals each having a matable contact portion which is adjacent to the mating face and which is matable with a complementary matable contact portion, at least three of the connector terminals having a winding end connection portion, the fourth connector terminal having a tab receptacle portion, the at least three winding ends extending to the at least three connector terminals and being connected to the winding end connecting portions thereof, a protector pocket is provided which is integral with the rear face of the housing proximate to one of the endwalls, an additional cavity is provided which is integral with the housing adjacent to the one endwall and beside the protector pocket, the additional cavity having an additional terminal therein which has a tab receptacle portion and a winding end connecting portion, the protector being in the protector pocket with the first protector tab extending into the additional cavity and into the tab receptacle portion of the additional terminal, the one winding end extending into the additional cavity and connected to the winding end connecting portion of the additional terminal, the second protector tab extending from the protector body past the rear face and into the cavity containing the fourth connector terminal, the second protector tab extending into the tab receptacle portion of the fourth connector terminal, whereby the individual lead wires can be connected to complementary terminals in the complementary connector and upon mating the complementary connector with the stator connector, the lead wires will be properly connected to the winding ends and the second protector tab.

2. An electric motor assembly as set forth in claim 1 characterized in that the winding end connecting portions of the terminals comprise wire-receiving slots, the winding ends being received in the slots, the matable contact portions of the connector terminals comprising connector terminal tabs.

3. An electric motor assembly as set forth in claim 2 characterized in that the second sidewall has wire-admitting slots therein, the winding ends extending through the wire-admitting slots and to the wire-receiving slots.

4. An electric motor assembly as set forth in claim 1 characterized in that the protector pocket has an extension which extends beyond the one endwall, the additional cavity being in the extension.

5. An electric motor assembly as set forth in claim 1 characterized in that the stator has three coil windings thereon having six winding ends, one end of each coil winding being connected to the first protector tab.

6. An electric motor assembly as set forth in claim 4 characterized in that the protector pocket has a pocket wall which is parallel to, and spaced from, the rear face, the pocket being between the rear face and the pocket wall, the pocket having an open side, the protector being inserted into the pocket from the open side.

7. An electric motor assembly as set forth in claim 6 characterized in that the open side of the protector pocket is beside the second sidewall.

* * * * *